(No Model.)
H. P. FAIRFIELD.
ROTARY CUTTER.
No. 518,917. Patented Apr. 24, 1894.
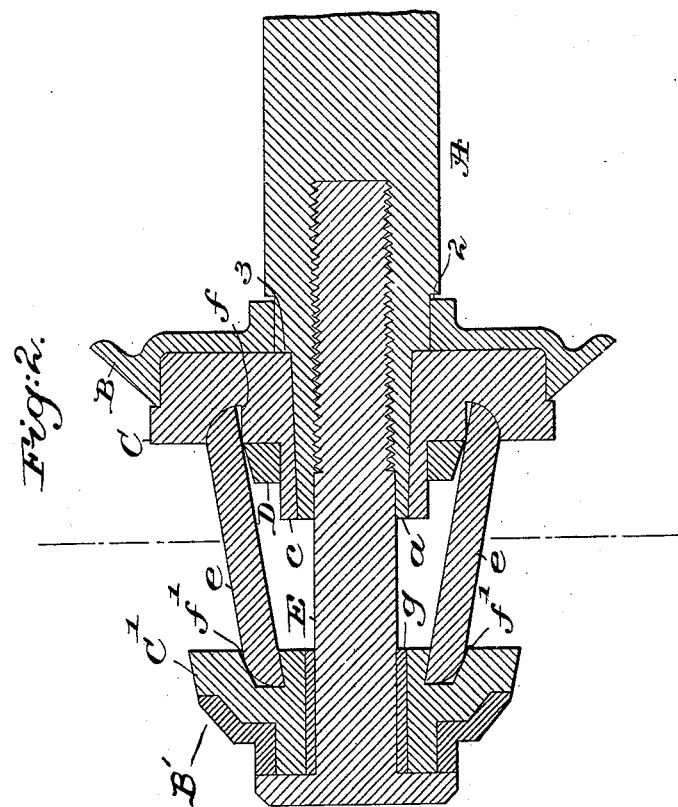
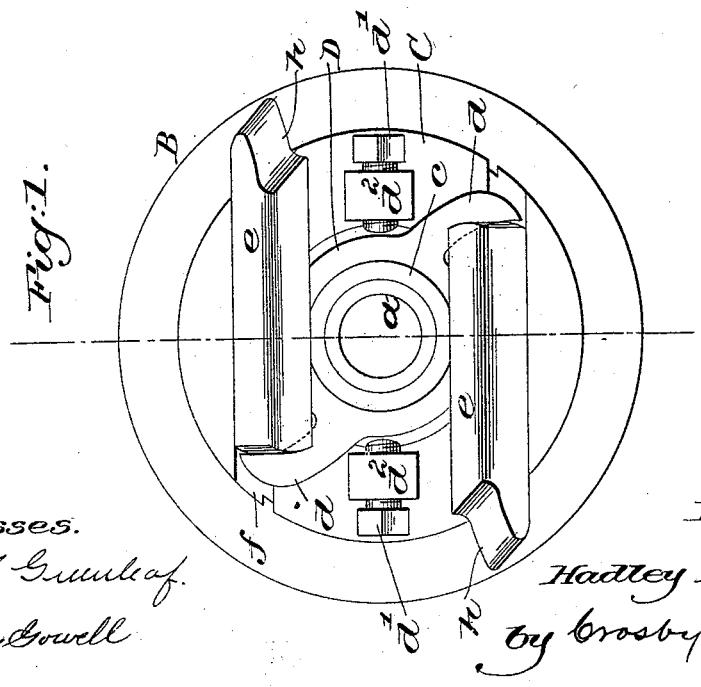
Witnesses.
Fred L. Greenleaf.
Louis K. Gowell.
Inventor
Hadley P. Fairfield,
by Crosby & Gregory
Attys

UNITED STATES PATENT OFFICE.

HADLEY P. FAIRFIELD, OF WEST MEDFORD, ASSIGNOR TO JAMES W. BROOKS, TRUSTEE, OF PETERSHAM, MASSACHUSETTS.

ROTARY CUTTER.

SPECIFICATION forming part of Letters Patent No. 518,917, dated April 24, 1894.

Application filed February 27, 1893. Serial No. 463,788. (No model.)

*To all whom it may concern:*

Be it known that I, HADLEY P. FAIRFIELD, of West Medford, county of Middlesex, State of Massachusetts, have invented an Improvement in Rotary Cutters for Leather, &c., of which the following description, in connection with the accompanying drawings, is a specification, like letters and figures on the drawings representing like parts.

In machines using rotary cutters for shaping leather, wood, &c., for heels, soles, &c., it is frequently necessary to change one cutter for another to give to the article being made the desired configuration, for it will be understood that the width of the blade and the particular configuration of its front or cutting edge is made to determine the shape of the cut. I have aimed to produce a cutter, which, with but slight changes and adjustments may be made to receive blades of different width and to hold them at any desired angle, and I have also adapted my improved cutter so that it may be adapted to different machines rather than to one machine. Ordinarily the side edges of the blades enter straight sided or dovetailed grooves in the disks holding them, the grooves being purposely so constructed as to preclude the possibility of the blade tipping in the direction of its width. In my experiments to cheapen the construction and increase the working capacity of the cutter-heads, I discovered that I might so make the grooves in the blade-holding disks or plates, and the side edges of the blades to enter them that the blades would co-operate with disks of different diameter, and might be adapted to occupy more or less angular positions from side edge to side edge. To do this, I have made each side edge of the blade as a quarter circle and the groove in the innermost disk or plate is in cross section of substantially the same shape.

Figure 1, in front elevation shows a rotary cutter embodying my invention, the outer disk or plate and the clamp-screw being omitted. Fig. 2, a section of the cutter showing the outer head and clamp-screw, omitted from Fig. 1.

Referring to Figs. 1 and 2, let A represent the cutter-carrying shaft, it being adapted to be rotated in any usual manner. The shaft is shouldered at 2 to receive on it loosely the tread guard B, into which enters one part of the disk or plate C, the hub of which has a taper bore to fit a tapered extension $a$, of the shaft A, the rear side of the disk or plate meeting a shoulder 3. The hub $c$ of the disk or plate C receives on it a blade adjuster D having fingers $d$, $d$, to act against the rear ends of the blades $e$ and to adjust them simultaneously in their guiding grooves, suitable set screws $d'$ in ears $d^2$ of the disk or plate C serving to hold the adjusting device in position. The shaft A is threaded to receive the clamping device E, shown as a bolt, which is extended through the disk or plate C', provided with a counter guard B' loosely mounted on it, the head of the clamping device thus acting to force one disk or plate toward the other and through the blades $e$ force the disk or plate C firmly onto the tapered collar $a$, so as to rotate with the said shaft. The side edges of the blades are shaped to present substantially one-fourth of a circle, as best shown in Fig. 2, said edges entering grooves in the disk or plate C, of suitable shape and size to receive said substantially quarter round edges and let them tip or turn therein, the grooves $f$ in the disk C also being substantially quarter round in cross section. In disk C' the outer and inner walls of the grooves $f'$ are preferably made tapering so as to act as a wedge against the edge of the blade entering it.

From the foregoing, it will be understood that the blades $e$, $e$, would work just as well if the grooves $f'$ were nearer or farther from the center of rotation of the shaft A, the quarter round edge entering groove $f$ being free to tip or rock therein as the wedge-like sides of the grooves $f'$ act on the other side edge of the blade.

In Figs. 1 and 2, I employ a cylindrical bushing $g$ between the bolt and the disk C' to fill up the hole in the disk and make it fit the said bolt, which, besides clamping the disks and blades together and holding them firmly in operative position, also serves as an extension of the main shaft.

In Fig. 1, $h$ represents the cutting edge, the blade being beveled backwardly from said edge.

Prior to my invention I am aware that the cutter blade receiving grooves in a disk have been shaped substantially as in the disk C' herein represented, and as in United States Patent No. 459,248, but the edges of the blades entering said grooves were of the same cross section and the blades could not by any possibility tip. In my invention, however, the edges of the blades integral with the blades are rounded to present a quarter circle, so that the said blades are free to tip in the groove in order that they may be used in connection with grooved disks of any desired diameter; and it will be further noted that with the groove and edge of the cutter blade shaped as herein represented, the cutter itself is held rigidly and fixedly when the two disks C, C' are crowded toward each other to clamp the cutter blades in working position. If the grooves in the disk C' and the side edges of the cutter blades were semi-circular in cross section, then such a groove would not hold fixedly the outer edge of the cutter blade. The side edges of the cutter blades which enter the grooves in the disk C are but quarter circles, and by employing such a shaped edge integral with the cutter blade, said edges entering a groove of the shape shown it is possible to form a blade which will readily tip in the groove of the cutter without the intervention of any intermediary device, as a round rod, to constitute a hinge. I avoid the formation of a hinge and also do not require any independent adjustable pieces to keep the holder for the edge of the blade in position in the disk.

I do not claim a blade having a V-shaped side edge to enter a round rod having a corresponding V-shaped groove and mounted in a disk, the said rod forming a hinge connection between the blade and the disk.

Having described my invention, what I claim as new, and desire to secure by Letters Patent, is—

1. A rotary cutter composed of blades having their side edges quarter-circular in shape from one to their other face, and two disks or plates C, C', one disk or plate having a groove substantially V-shaped in cross section, while the other disk or plate has grooves sufficiently larger than the quarter-circular edges of the blades entering them to let said edges tip in said grooves, to thereby adapt the blades to the diameter of the disk or plate having the substantially V-shaped grooves, said latter grooves holding the edges of the blades firmly so that they cannot tip therein, substantially as described.

2. A rotary cutter composed of blades having their side edges quarter-circular in shape from one to their other face, and two disks or plates C, C', one disk or plate having a groove substantially V-shaped in cross section, while the other disk or plate has grooves sufficiently larger than the quarter circular edges of the blades entering them to let said edges tip in said grooves, to thereby adapt the blades to the diameter of the disk or plate having the substantially V-shaped grooves, said latter grooves holding the edges of the blades firmly so that they cannot tip therein, and a clamping device to clamp the said disks together, substantially as described.

3. A rotary cutter composed of two disks or plates having blade-receiving grooves, blades entering said grooves, the side edges of the blades integral therewith being substantially quarter circular in cross section to enter and tip in said grooves to adapt the blades to the distance of the grooves from the center of rotation of the said disks or plates, combined with a tread guard and a blade adjusting device to simultaneously adjust the said blades longitudinally, substantially as described.

In testimony whereof I have signed my name to this specification in the presence of two subscribing witnesses.

HADLEY P. FAIRFIELD.

Witnesses:
GEO. W. GREGORY,
M. J. SHERIDAN.